United States Patent [19]

Staempfli

[11] Patent Number: 4,466,197
[45] Date of Patent: Aug. 21, 1984

[54] DEVICE FOR MEASURING OR DETECTING THE DEGREE OF INCLINATION OF AN OBJECT

[75] Inventor: Jackie Staempfli, Genève, Switzerland

[73] Assignee: Valinor, S.A, Vaduz, Liechtenstein

[21] Appl. No.: 333,872

[22] PCT Filed: Jun. 18, 1981

[86] PCT No.: PCT/CH81/00068
§ 371 Date: Dec. 17, 1981
§ 102(e) Date: Dec. 17, 1981

[87] PCT Pub. No.: WO82/01412
PCT Pub. Date: Apr. 29, 1982

[30] Foreign Application Priority Data

Oct. 17, 1980 [CH] Switzerland .......................... 7770/80

[51] Int. Cl.³ .............................................. G01C 9/20
[52] U.S. Cl. ..................................................... 33/377
[58] Field of Search ................. 33/377, 367, 370–373, 33/333, 334, 340, 341, 343, 347, 353, 273, 295, 390; 138/102; 89/1 J, 41 E, 14 R

[56] References Cited

U.S. PATENT DOCUMENTS 1,274,333 7/1918 Roland .................................. 33/377
1,531,191 3/1925 Karnes .................................. 33/333
1,958,314 5/1934 Reid ...................................... 33/377
2,019,178 10/1935 Elsom .................................. 33/377

FOREIGN PATENT DOCUMENTS 52613 1/1890 Fed. Rep. of Germany .
105682 9/1900 Fed. Rep. of Germany ........ 33/377
672392 4/1936 Fed. Rep. of Germany .
1601197 12/1968 France .
607101 6/1979 U.S.S.R. .

Primary Examiner—Harry N. Haroian
Attorney, Agent, or Firm—Cushman, Darby & Cushman

[57] ABSTRACT

The present device comprises a tubular sleeve (1) which is opaque and which surrounds a part of the length of a tube (2), and provided with an observation window (3) permitting the appearance of the level (4) of a liquid contained in a first tubular compartment (5) forming part of a system of communicating vessels. An annular chamber (10) communicates with the compartment (5), particularly by way of a second compartment (12) and a connecting conduit (11). The ratio between the section of the annular chamber (10) and that of the tubular compartment (5) is such that the variation in the liquid level is very strong in this compartment as compared with that in the annular chamber.

The invention is particularly applicable to a sighting device for a mortar.

3 Claims, 3 Drawing Figures

DEVICE FOR MEASURING OR DETECTING THE DEGREE OF INCLINATION OF AN OBJECT

The invention relates to a device for measuring or detecting the degree of inclination, in a vertical plane, of the axis of a tubular object, from a viewing position situated in this same plane, the said device comprising a system of communicating vessels, which is integral with the tubular object and contains a liquid.

The measuring of the degree of inclination of an object from a viewing position situated perpendicularly of the vertical plane of inclination of a reference axis of this object can easily be effected, since it is possible to materialise the angle of inclination and to observe this angle. On the contrary, the measuring of the degree of inclination of an object from an observation or viewing position situated in the actual plane of inclination cannot be achieved by direct simple observation of the angle of inclination.

Therefore, the invention has for its object to provide a device, which is simple and can easily be used, enabling this problem to be resolved.

To this end, the device according to the invention, comprises a system of communicating vessels composed of a first tubular compartment, of which at least a part of the wall is transparent or translucent, in such manner as to permit the observation of the level of the liquid in an annular chamber disposed perpendicularly of the axis of the tubular object and a second tubular compartment which is parallel and diametrically opposite to the first, the axes of the two tubular compartments being situated in the vertical plane of inclination of the axis of the object, the upper ends of these compartments opening into the annular chamber and their lower ends communicating with one another by way of a connecting conduit, the quantity of liquid in the system of communicating vessels being such that its level is in the vicinity of the upper end of the first compartment for the minimal inclination of the object axis relatively to the vertical and the ratio of the section of the annular chamber to that of the first compartment being sufficiently large for the variation of the level in this chamber, when the axis of the object is subject to an inclination, to be practically negligible in relation to the variation in level in the first compartment.

The invention will be better understood from the description of one embodiment of the device, as given below in respect of a non-limiting example, and with reference to the accompanying drawings, in which.

Figure 1:
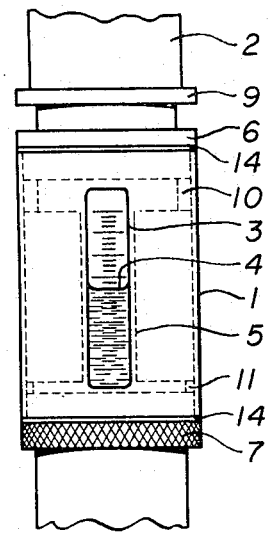
FIG. 1 is a diagrammatic front view, in perspective, of the device.

The constructional form of the device as shown in the drawings is intended for permitting the measurement of the inclination of a mortar barrel, with a view to adjusting the firing range.

Figure 2:
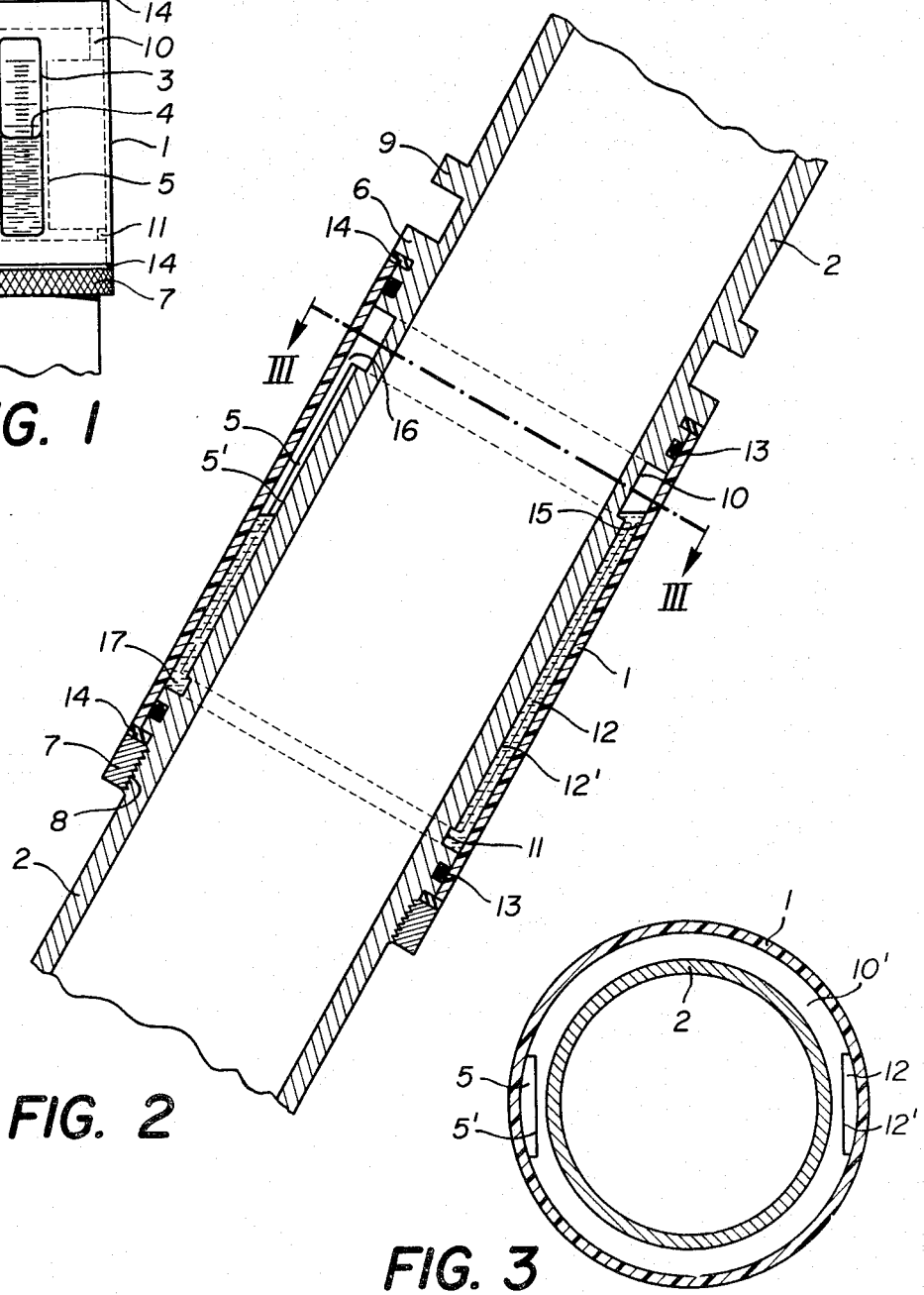
FIG. 2 is a diagrammatic section of the device as shown in FIG. 1, along a vertical sectional plane perpendicular to the plane of FIG. 1.

As will be seen from FIG. 1, the device comprises a tubular sleeve 1 surrounding a part of the length of the mortar barrel 2, this sleeve being opaque and formed with a viewing window 3, through which can be seen the level 4 of the liquid contained in a tubular compartment 5 forming part of a system of communicating vessels. The sleeve 1 is held in a fixed position against a shoulder 6 of the tube 2 by means of a locking nut 7 which engages a screw-thread 8 formed on the barrel 2 (FIG. 2). The shoulder 6 cooperates with another shoulder 9 with a view to the fastening of fixing means (not shown) of carrying strap or sling (also not shown) of the barrel 2. The observation window 3 carries a graduated scale, which makes possible the reading of the position of the level 4 of the liquid. This scale may advantageously be provided with indications which correspond to the firing range and expressed, for example, in meters and, as in well known, is in direct relation with the inclination of the barrel for an ammunition having given characteristics.

Figure 3:
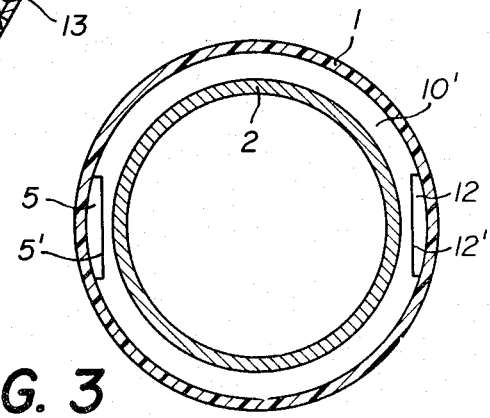
FIG. 3 is a diagrammatic section of the device along the plane III—III indicated in FIG. 2.

An annular chamber 10 is defined by the sleeve 1 and by an annular groove 10' formed in the wall of the barrel 2. This chamber communicates with the compartment 5 by way of a conduit which consists of a first annular branch 11, defined by the sleeve 1 and an annular groove 11', and second branch 12, which is rectilinear and parallel to the axis of the barrel 2, this branch being defined by the sleeve 1 and a longitudinal channel 12 (FIGS. 2 and 3) formed in the wall of the barrel 2.

The compartment 5 is likewise defined by the sleeve 1 and a longitudinal channel 5' formed in the wall of the barrel 2.

The annular chamber 10 communicates with the respective upper ends of the compartment 5 and of the rectilinear branch 12 of the connecting conduit and the annular branch 11 of this latter communicates with the respective lower ends of the compartment 5 and of the rectilinear branch 12 of this conduit.

As will be seen in FIG. 2, the tightness of the communicating vessel system as thus formed inside the sleeve 1 is assured by means of two O-ring seals 13. Circular shock-absorbing packings 14 are positioned between the ends of the sleeve 1 and the shoulder 6, at one end, and the locking nut 7, at the other end.

The device functions in the following manner; the filling level of the liquid is regulated in such manner that when the axis of the barrel 2 is vertical, the level of the liquid in the compartment 5 reaches a position close to the upper end 16 (FIG. 2) of this latter, and thus at the level of the lower edge of the groove 10'. The level of the liquid in the branch 12 of the connecting conduit then also comes to the level of the lower edge of the groove 10', the compartment 5 and the two branches 11 and 12 of the connecting conduit being completely filled with liquid and the chamber 10 being empty.

As will be seen from FIG. 2, when the axis of the barrel 2 is inclined in the vertical plane of symmetry of the compartment 5 and of the rectilinear branch 12 of the conduit for connecting this latter to the chamber 10, the level of the liquid in the compartment 5 falls and a liquid volume corresponding to the decrease in volume occupied by the liquid in the compartment 5 flows by way of the upper orifice 15 of the branch 12 of the connecting conduit into the chamber 10. Due to the fact that the section of the chamber 10 is much larger than that of the compartment 5, the level of the liquid is not substantially raised above the level of the lower edge of the groove 10' in proximity to the upper orifice 15 of the branch 12 of the connecting conduit. This is even the case when the maximum inclination of the axis measurable by means of the device is reached, that is to say, when the level of liquid in the compartment 5 falls to the proximity of the lower end 17 of this latter.

The reading of the level of the liquid in the compartment 5 makes possible the measurement of the degree of inclination of the axis of the barrel 2 between the vertical position, which corresponds to the maximum level, reached in proximity to the upper end 16 of the compartment 5, and the maximum inclination corresponding to the minimum level reached in proximity to the lower end 17 of this compartment.

Thanks to the fact that the liquid level in the chamber 10 is not in practical use raised above the upper orifice of the branch 12 of the connecting conduit, the amplitude of the displacement of the liquid level in the compartment 5, for a given variation of the angle of inclination of the barrel 2, is approximately doubled with respect to the case of a communicating vessel system in the form of a simple U-tube of constant section, and therefore not having an annular chamber 10, but an extension of the branch 12 of the connecting conduit, parallel to the axis of the barrel. The device as described thus makes it possible to some degree to achieve a "demultiplication" of the amplitude of displacement of the level of the liquid in the compartment 5 when the barrel is inclined, this resulting in an increase in the sensitivity and in the accuracy of the reading.

In order to permit a rapid damping of the oscillations of the level of the liquid after a change in the inclination of the barrel, and consequently to avoid any lost time before the reading, and also to permit the stabilisation of the position of equilibrium of the liquid level, for example, in the event of the device having to be used in an environment where shocks, jolting and vibrations are produced, it may be advantageous for the section of the connecting conduit to be smaller than that of the tubular compartment 5, at least over a part of the length of the said conduit, for example, the annular branch 11.

With a view to facilitating the reading of the position of the liquid level, for example, at night or in fog, it may be advantageous to equip the device with means for emitting or reflecting light, formed for example by a chamber containing a luminescent substance, placed behind the tubular compartment 5, and to use, as liquid which is opaque to the light thus emitted or reflected.

The fact of making possible the reading of the degree of inclination of the axis of the tube or barrel from an observation point or position situated in the vertical plane of inclination of the said axis represents an important advantage in the use of the device in connection with a mortar, since it is thereby made possible for the sighting and the adjustment of the range to be carried out in the same position.

However, the use of the device is not in any way limited to that which has just been described, because the use of the said device offers advantages in many other fields of application, where it is desirable to be able to measure the degree of inclination of the axis of an object from an observation position located in the vertical plane of inclination of this axis, or in proximity to this plane, for example, for reading off the inclination of a crane jib or the arm of an excavator machine from the driver's cab, or else the slope of a ladder, an embarkation gangway, etc.

I claim:

1. Device for measuring or making possible the calibration of the degree of inclination, in a vertical plane, of the axis of a tubular object, from an observation or viewing position situated in this same plane, the said device comprising a system of communicating vessels, which system is integral with the tubular object and contains a liquid, wherein said system is composed of a first tubular compartment (5) parallel to the axis of the tubular object, at least a part of the wall of the compartment (5) being transparent or translucent, in such a manner as to permit the observation of the level of the liquid, of an annular chamber (10), disposed perpendicularly of the axis of the tubular object (2) and of a second tubular compartment (12) parallel to and diametrically opposite to the first (5), the axes of the two tubular compartments (5) and (12) being situated in the vertical plane of inclination of the axis of the object (2), the upper ends of these compartments opening into the annular chamber (10) and their lower ends communicating with one another by way of a connecting conduit (11) disposed on the periphery of the tubular object, the quantity of the liquid in the communicating vessel system being such that its level is located at the upper end of the first compartment (5) for the minimal inclination of the axis of the object (2) relatively to the vertical and the ratio of the section of the annular chamber (10) to that of the first compartment (5) being sufficiently large for the variation of the level in this chamber, when the axis of the object (2) is subjected to an inclination, to be negligible in relation to the variation in level in the first compartment (5).

2. Device according to claim 1, wherein the section of the second tubular compartment (12) and/or that of the connecting conduit (11) is smaller than that of the tubular compartment (5), at least over a part of their length.

3. Device according to claim 1 or claim 2, wherein the tubular compartments (5) and (12), the annular chamber (10) and the connecting conduit (11) are defined, firstly by recesses formed in the external surface of the wall of the object (2) and secondly by an external sleeve (1), which is transparent or translucent, at least in its part forming a wall of the tubular compartment (5), the recesses corresponding respectively to the annular chamber (10) and to the connecting conduit (11) being formed by annular grooves or channels (10' and 11') perpendicular to the axis of the object (2) and the recesses corresponding to the tubular compartments (5 and 12), respectively, being formed by grooves (5' and 12') parallel to the axis of the object (2) and diametrically opposite to one another.

* * * * *